United States Patent [19]

Pohl

[11] Patent Number: 4,786,013

[45] Date of Patent: Nov. 22, 1988

[54] FLAP DRIVE WITH VARIABLE TORQUE LIMITING

[75] Inventor: Ulrich Pohl, Bremen, Fed. Rep. of Germany

[73] Assignee: MBB GmbH, Bremen, Fed. Rep. of Germany

[21] Appl. No.: 64,325

[22] Filed: Jun. 19, 1987

[30] Foreign Application Priority Data

Jun. 21, 1986 [DE] Fed. Rep. of Germany ....... 3620886

[51] Int. Cl.⁴ ............................................. B64C 13/24
[52] U.S. Cl. .................................. 244/75 R; 244/213
[58] Field of Search ............. 244/213, 214, 215, 75 R; 74/710.5, 711

[56] References Cited

U.S. PATENT DOCUMENTS

| | | | |
|---|---|---|---|
| 3,935,754 | 2/1976 | Comollo | 244/213 |
| 4,260,121 | 4/1981 | Baston et al. | 244/213 |
| 4,273,006 | 6/1981 | Woodbury | 244/213 |

FOREIGN PATENT DOCUMENTS 3133961 4/1983 Fed. Rep. of Germany ...... 244/215

*Primary Examiner*—Galen Barefoot
*Assistant Examiner*—Rodney Corl
*Attorney, Agent, or Firm*—Ralf H. Siegemund

[57] ABSTRACT

Flaps mounted on an carriage are being protracted and retracted in relation to a aircraft wing of which the flap is a part by a drive mechanism which is to be provided for variable torque and torque limiting and, if necessary, fixing and holding the position of the flap and its drive carriage in case of failure. A branching gear is driven for the common shaft which drives the flaps of one wing and there are separate transmission paths which include in each instance output shafts from the branching gear, crank drives and thrust rods. One of the thrust rod is directly connected to the flap carrying carriage and the other one indirectly through a load switch and a connecting rod; in addition one of the output shafts of the branching gear is lead into a delta alpha brake having as a second input, the output of the principle drive shaft. The delta alpha brake stops motion of the flap carrying carriage in case there is an angle difference among its input shafts that exceeds a particular limit.

5 Claims, 2 Drawing Sheets

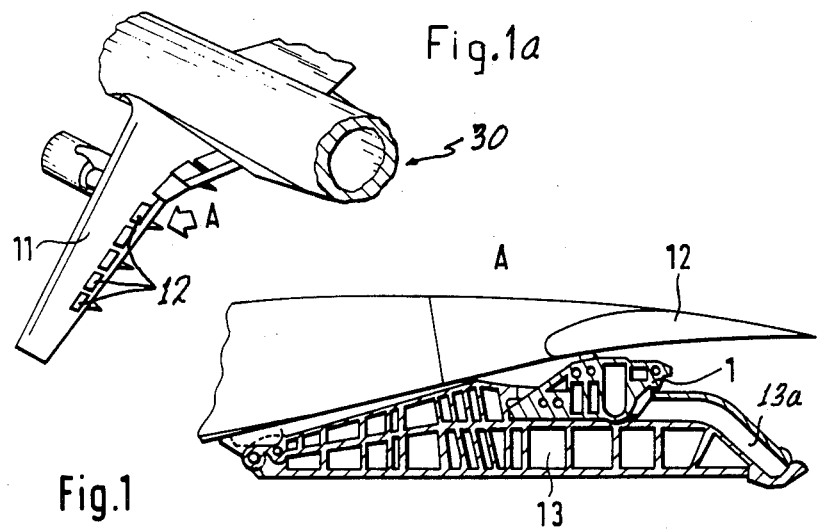
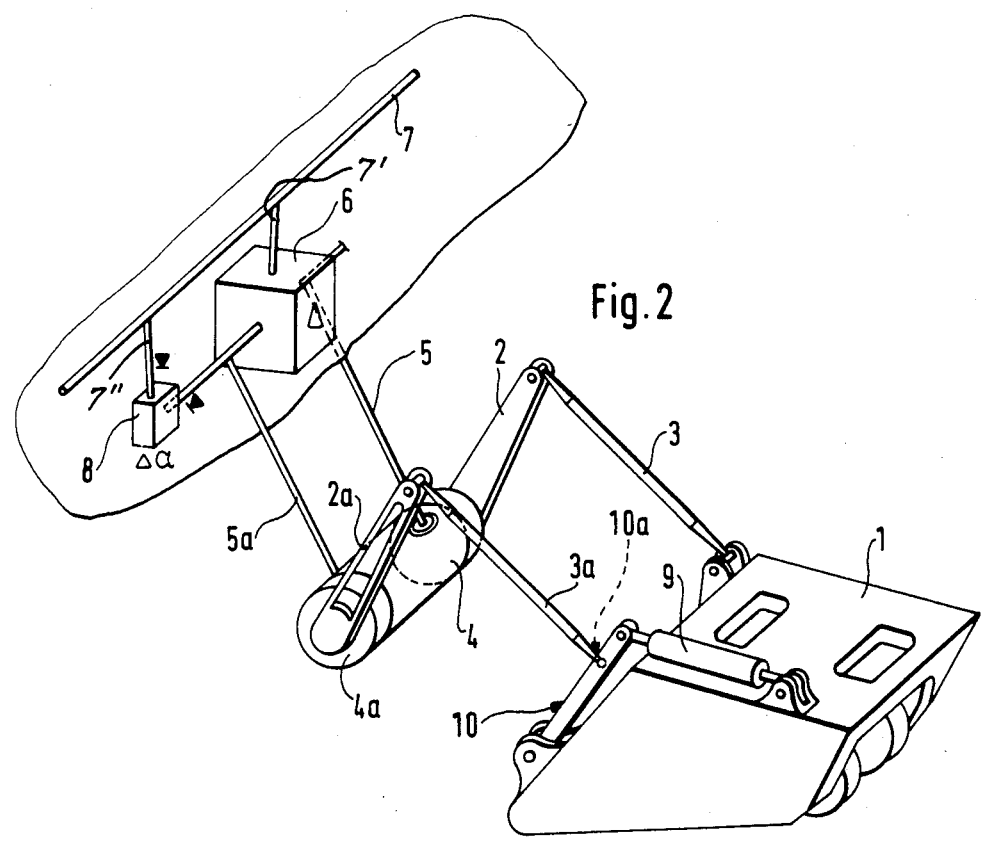

FLAP DRIVE WITH VARIABLE TORQUE LIMITING

BACKGROUND OF THE INVENTION

The present invention relates to equipment for producing protraction and retraction of aerodynamic profiles such as landing flaps, on the wings of an aircraft; and more particularly the present invention relates o a flap protraction and retraction device with variable torque limiting, position arresting and guiding of movement in accordance with a prescribed path under utilization of a carrier system which includes two or more carriers with drive and track system being a portion of and pertaining to the wing.

Aircraft with aerodynamically contoured wings are usually equipped with landing flaps which, in dependence upon the particular flight condition and situation, are to assume certain positions. It is known here to provide those flaps on carriages and to run these carriages in rails to obtain protraction and retraction of the landing flap. The carriages are driven by means of common, central drive unit using a shaft and gear transmission system which connects the central drive with the several landing flaps and their carriages. The drives specifically may be constructed as crank drives which are directly connected to outputs of differential gear. Drives of this type are used in aircraft of the types known under the tradenames AIRBUS A320, B 747 and B 767. The AIRBUS A300 and A310 and also the VFW 614 plane use torque limiters in addition to the drive spindles. These torque limiters serve as overload protection devices which in case particular torques occur provide coupling or braking function.

DESCRIPTION OF THE INVENTION

It is an object of the present invention to provide a new and improved flap drive system constructed to assure with certainty the requisite flap motion to reduce the weight of the flap and of the drive system, and to provide the overload protection right at a location where the determining force (to be monitored) occurs; moreover certain gear functions such as efficiency and non-linear transmission ratio remain without effect upon the flap system.

In accordance with the preferred embodiment of the present invention, it is suggested to provide the following coordination of elements. The load for moving a flap moving carriage is run through two paths from a common differential branching gear. The two paths in each instance include a thrust rod, a crank drive and a differential gear; the common differential gear is driven from a central drive unit for all of the flaps (or a wing) and mechanical so-called delta alpha brake monitors the movement of the carriage mechanically such that the effective turning of one branch is referenced against the common drive turning with braking occuring in case there is a impermissible difference in the rotation. One of the thrust rods is connected by means of a test eccentric to a rod which in turn is secured to one of the connection to the particular carriage there being a load switch interposed.

The delta alpha brake is connected to the principle drive shaft as well as to one of the output shafts of the common differential and branching gear. The turning angles of the shafts are mechanically compared to each other. This delta alpha brake includes a brake drum which is connected to one end of the two shafts and in a slidable fashion. The other input of the delta alpha brake is connected to the principle drive shafts through a threaded connection. The two ends of the two input shafts for the brake are particularly journaled in the casing for brake. Brake brackets are provided in between two stop members and in a floating fashion.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1a is a somewhat schematic, partially perspective and cut-off view of an aircraft with an extensive flap system, primarily the figure serves the purpose of orientation;

FIG. 1 is a cross-section through the wing of the aircraft shown in FIG. 1a, with a partial full illustration of parts, the figure demonstrating a particular way the inventive combination is practiced;

FIG. 2 is a somewhat schematic and perspective view of a landing flap drive improved in accordance with the preferred embodiment of the present invention for practicing the best mode thereof.

DETAILED DESCRIPTION OF THE DRAWINGS

Figure 3:
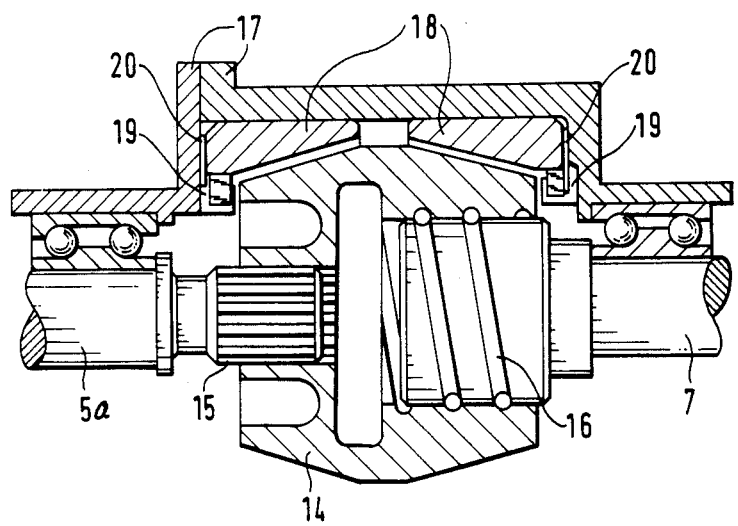
FIG. 3 is a cross-section through a delta alpha brake employed as a unit in the drive shown in FIG. 2.

FIG. 1a shows a part of the fuselage 30 and a wing 11 with an engine of an aircraft. A plurality of landing flaps 12 are as provided on the wing, particularly the upper surface thereof. Basically, the flap arrangement as such is conventional practice particularly as far as the individual flaps as such are concerned as well as the distribution of such flaps over the wing. Convertibility of this is relied upon. The invention is related to a specific mechanism for the protraction and retraction of these flaps.

Any particular landing flap 12 is guided and held by and in at least two stations inside the wing 11. Each such station includes a landing flap carrying carriage 1, as shown in FIGS. 1 and 2, provided to run in a guide tract 13a of a guide and support structure 13. The drive for the flap includes a central drive unit which is located somewhere in the fuselage or in the area where the wing meets the fuselage 30. This central drive drives a shaft 7 which is the main drive shaft for all the flap operating mechanisms in the particular wing 11 shown. The shaft 7 drives, through gears, secondary brake shafts such as 7' and 7'' wherein the shaft 7' is connected to and provides an input for a differential or, better, branching gear 6. This gear 6 has thus two output shafts 5 and 5a each of which driving a differential gear, there being gears 4 and 4a accordingly.

The differential gears 4 and 4a in turn, operate respectively two crank drives 2 and 2a which in turn move thrust rods 3 and 3a. The one carriage 1 for the landing flap 12 is connected to these thrust rods 3 and 3a. Another carriage for the frame landing flap is provided at a location appropriate for the flap. Otherwise the connector and drive is the same as the one illustrated. Dividing the forces for moving a landing flap carriage into two load transmission paths is the main function of differential or branching gear 6. This two path drive has the advantage that, for example in the case of a failure of one drive or branch element the other one still has the capability to hold the mechanical and aerodynamic load on this flap through the second loaded path.

Through a so-called delta alpha brake 8 one monitors continuously the revolution and turning angle of the shaft 7 (through branch 7'') as well as the output shaft 5a. By this particular case, the comparison is made between the turning of output shaft 5a of the differential branching gear 6 and the branch drive 7''. It is the task of the delta alpha brake 8 to insure that there is no, or only a particular (relatively insignificant) angular difference "delta alpha" between the shafts 5a and 7 (7''). That difference may result from load retardation on shaft 5a. If the angular difference exceeds a particular value or limit then the brake 8 will brake the shafts 5 and 5a in order to stop and hold the carriage 1 of the landing flap in the particular position. In case of a failure such as a fracture, one of the elements in the double load path and/or in case of damage to the gear 6, the angle difference limit value in automatically exceeded so that in the case of such a failure the delta alpha brake 8 will respond and lock the entire drive system for the carriage 1 which must retain now its position.

The thrust rod 3a is not directly connected to the carriage 1. Rather there is a rod 10 and a load switch 9 is interposed. The load switch has a force vs tension characteristic with a strong bend. Therefore, if the tension compression force acting upon this part exceeds a particular limit it will in fact excessively change its length. Arranging such a particular element within the inventive drive makes sure that for example, the carriage 1 will positively be blocked if interferences in the drive and flap arrangement have lead to angular difference between various elements acting on the delta alpha brake and insures therefore that the drive system comes to complete stop. The requisite turn off torque for the shaft 5a is dependent upon the position of the cranks 2 and 2', and this is immediately of interest as far as the arrangment of the load switch 9 right at the point of origin of the requisite force is concerned.

For monitoring operability and proper function of the delta alpha brake 8 one will include a so-called test cam or eccentric connect and test point 10a such that an eccentrically positioned fastening bolt simulates artificially a path different between the two load path 3-5 and 3a-5a. This condition is for example established during an inspection for maintenance etc.. The thrust rod 3a is connected simply to a different position on rod 10 by means of that connection 10a. This artificially introduced path difference activates (or should activate!) if the alpha brake 8 provided in the arrangement is indeed operable. This brake 8 is not activated, failure is indicated therewith.

After having described the overall arrangement, reference is made not to FIG. 3 showing more specifically the delta alpha brake unit 8. It includes a brake drum 14 which is slidably disposed on the drive shaft 5a, there being a spline connection 15 interposed. The other end of the brake drum 14 includes a thread-like connection 16 to the shaft 7. Both acting ends of the respective shafts 5a and 7 are journaled in a brake housing 17 which contains also brake brackets 18. A differential in the turning of shafts 5a and 7 in the delta brake causes the brake drum 14 to shift. The delta alpha brake 8 will be effective when upon that turning any displacement and play between the drum 14 and the braking brackets 18 has been "used up".

The brackets 18 are floatingly mounted in the brake casing or housing 17 on axial bearing 20 and between the abutment stops 19. They therefore can rotate in a peripheral direction by about 180 degrees without impediment. Since the release or trigger moment of the brackets 18 is smaller than the brake torque, it is possible to operate the delta alpha brake 8 reversibly through the shaft 5a simply by a changing the direction of rotation which then terminates the brake operation.

The invention is not limited to the embodiments described above, but all changes and modifications thereof, not constituting departures from the spirit and scope of the invention are intended to be included.

I claim:

1. In a drive arrangement for a landing flap on an aircraft wing which includes structure for variable torque limiting and position fixing, the particular flap being mounted on at least one carriage, the improvement comprising:
   a principal drive shaft for operating the particular and other landing flaps;
   a differential and branching gear having a common input connected to said principle drive shaft and having two output shafts to establish two load transmitting paths;
   two additional differential gears respectively connected to and driven by said two output shafts;
   two crank drives respectively connected to and driven by said two additional differential gears;
   two thrust rods respectively connected to said crank drives;
   one of the thrust rods being directly connected to the flap carrying carriage;
   the other thrust rod being connected through a connecting rod and a load switch to said carriage, there being a variable test point connection provided between the other thrust rod and said connecting rod; and
   a mechanical delta alpha brake being interposed between said principle shaft and one of the output shafts of the branching differential gear.

2. The device in claim 1 wherein the delta alpha brake mechanically compares the turning angles of the shafts connected to it and provides braking action if the angle exceeds a predetermined limit.

3. The device in accordance with claim 1 said delta alpha brake including a brake drum slidably mounted on one of the shafts and connected with a thread connection to the other one of the shafts which are included in the delta alpha brake.

4. The device in accordance with claim 3 wherein said two shafts are journaled in a casing for the delta alpha brake.

5. The device in accordance with claim 4 and including brake brackets floatingly mounted in between two stops.

* * * * *